A. P. LOWER.
FISHING LINE FLOAT.
APPLICATION FILED JUNE 1, 1921.
1,418,944. Patented June 6, 1922.
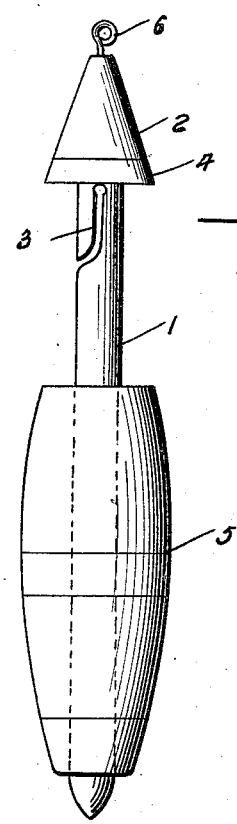
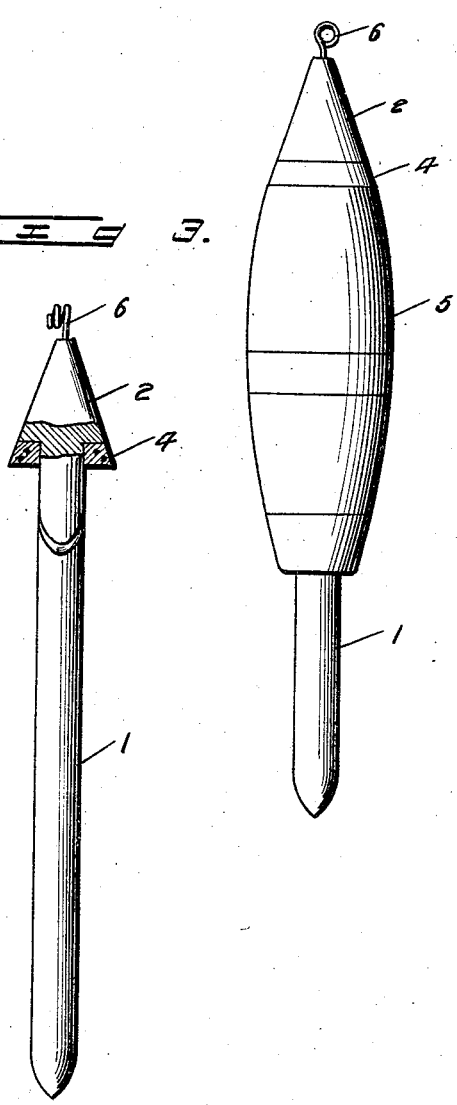
Inventor
A. P. Lower
By ........ Attorney

UNITED STATES PATENT OFFICE.

ALFRED P. LOWER, OF BRADFORD, OHIO.

FISHING-LINE FLOAT.

1,418,944.     Specification of Letters Patent.    Patented June 6, 1922.

Application filed June 1, 1921. Serial No. 474,181.

*To all whom it may concern:*

Be it known that I, ALFRED P. LOWER, a citizen of the United States, residing at Bradford, in the county of Miami and State of Ohio, have invented certain new and useful Improvements in a Fishing-Line Float; and I do hereby declare the following to be a full, clear, and exact description of the invention, such as will enable others skilled in the art to which it appertains to make and use the same.

The invention relates to floats or bobs for fishing lines whereby the same may be easily and quickly adjusted on the line or applied thereto or removed therefrom as required, the float occupying an upright position in the water since the lower end of the line exerts an axial pull thereon.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is an elevation of a fishing line float or bob embodying the invention.

Figure 2 is a view similar to Figure 1, the cork body being moved upwardly on the stem, and Figure 3 is a detail view of the stem.

Corresponding and like parts are referred to in the following description and designated in the several views of the drawings by like reference characters.

The device comprises a stem 1 having a conical end 2, the same consisting preferably of hard wood which is rendered water proof by means of shellac. A slot 3 is formed in the stem 1 adjacent the conical end 2 and opens outwardly through a side of the stem whereby provision is had for ingress and egress of the line when it is required to place the same in position or remove it from the stem. The slot 3 is disposed centrally of the stem 1 and extends longitudinally thereof with its receiving or entrance portion curving laterally. A washer 4 is slipped upon the stem 1 and engages the shoulder at the base of the conical end 2. This washer preferably consists of cork although any similar material may be advantageously employed. The cork body 5 is slidable on the stem 1 and fits the same snugly so as to be retained in the adjusted position. The body 5 is shellacked to render it water proof and may be finished according to any design. The body 5 completely closes the slot 3 and its inner end abuts the washer 4. The outer side of the parts 2, 4 and 5 are flush and symmetrical so as to present a uniform appearance. When it is required to place the line in the slot 3 or remove it therefrom, the body 5 is moved outward on the stem 1 as indicated in Figure 1. When the line is in position it passes transversely through the slot 3 between the washer 4 and the inner or abutting end of the body 5.

A tip 6 is attached to the pointed end of the stem 1 and comprises a plurality of coils closely related so as to secure the line by a binding action. The tip 6 is formed of spring wire, one end of which is pressed into the pointed end of the stem to retain the tip in position and the opposite end portion of which is formed into a number of coils between which the line is passed and made secure by a gripping action. The arrangement is such as to permit of the lower portion of the line exerting a pull upon the stem 1 in line with the action thereof, whereby in operation the float or bob will occupy a vertical position in the water and not lead to one side as is the case with the usual float.

While, as stated, it is preferred to construct the stem 1 of wood which is rendered waterproof, it is obvious that the same may consist of celluloid or other material which does not require coating or treatment to render the same proof against the action of moisture.

Having thus described the invention, what I claim is:—

1. A fishing line float comprising a stem having a slot therein for the reception of the line, a washer of yieldable material on the stem and limited in its outward movement thereon, and a float slidable on the stem and adapted to close the slot therein and clamp the line between it and the said washer.

2. A fishing line float comprising a stem having a line receiving slot near one end thereof, a body slidable upon the stem and adapted to close said slot and secure the line therein, and a tip at the end of the stem adjacent the slot and adapted to clamp the line.

3. A fishing line float comprising a stem having a conical end whose base is of larger diameter than the stem, and having a line receiving slot adjacent the base of the conical end, a washer on the stem and abutting the shoulder at the base of the conical end, and a body slidable upon the stem with its inner end in abutting relation with the washer and adapted to close the slot in the stem.

In testimony whereof I affix my signature in presence of two witnesses.

ALFRED P. LOWER.

Witnesses:
J. L. PARIM,
LAVINA HARTLE.